United States Patent Office 3,391,200
Patented July 2, 1968

3,391,200
NOVEL DIOL AND POLYMER THEREOF
Rostyslaw Dowbenko, Gibsonia, Pa., assignor to Pittsburgh Plate Glass Company, Pittsburgh, Pa., a corporation of Pennsylvania
No Drawing. Continuation-in-part of application Ser. No. 409,960, Nov. 9, 1964. This application Oct. 2, 1967, Ser. No. 672,021
3 Claims. (Cl. 260—633)

ABSTRACT OF THE DISCLOSURE

This invention relates to compounds of the formula:

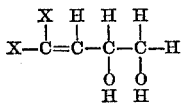

where X is selected from the group consisting of chlorine and bromine. These compounds may be used as diols in the preparation of polyester resins; likewise, they may be reacted with acrylyl chloride to produce resin monomers.

CROSS-REFERENCES TO RELATED APPLICATIONS

This application is a continuation-in-part of U.S. application Ser. No. 409,960, filed Nov. 9, 1964 and now abandoned.

STATE OF THE ART

Halogenated alkendiols are known in the art, compounds such as 4-bromo-1,2-dihydroxy-3-butene, for example. The compounds of the instant invention display surprising and heretofore unknown reactivity as compared to these prior art compounds. For example, the compounds of the invention, in the presence of a base, undergo cyclization and aromatization (furanization), e.g.,

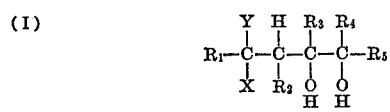

See, Chemistry & Industry, Aug. 7, 1967, pp. 1425–6. The compounds, such as 4-bromo-1,2-dihydroxybutene-3, on the other hand, dehydrohalogenate to an alkyne. Further hydrolysis of the compounds of the invention produces a lactone which may be polymerized, while hydrolysis of the prior art monohalodihydroxybutenes under the same conditions produces either an aldehyde or alkyne.

DESCRIPTION OF THE INVENTION

This invention relates to novel unsaturated vicinal diols and a method of their preparation. More particularly, this invention relates to novel derivatives of 3-halo-1,2-dihydroxybutanes.

The diols which constitute the starting materials for the process of this invention correspond substantially to the formula:

(I) 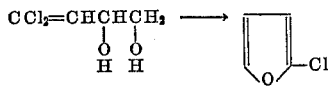

where X is a halogen (i.e., chlorine, bromine or fluorine), Y is chlorine or bromine, $R_1$ is halogen or lower alkyl, and $R_2$, $R_3$, $R_4$ and $R_5$ are each selected from the group consisting of hydrogen and lower alkyl radicals. A method for preparing the compounds of Formula I is disclosed in copending application Ser. No. 409,926, filed Nov. 9, 1964.

Examples of such compounds include:

4,4,4-trichloro-1,2-dihydroxybutane
4,4,4-tribromo-1,2-dihydroxybutane
4,4-dichloro-1,2-dihydroxypentane
4,4-dibromo-1,2-dihydroxyhexane
4,4,4-trichloro-1,2-dihydroxy-3-methylbutane
4,4,4-trichloro-1,2-dihydroxy-2-methylbutane
4,4,4-trichloro-1,2-dihydroxy-2-methylbutane
5,5,5-trichloro-2,3-dihydroxy-2-methylpentane It has now been found that the above compounds react with a base eliminating hydrogen halide to form unsaturated diols of the formula:

(II) 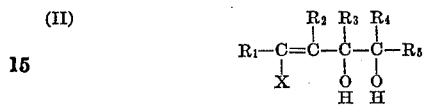

Thus, for example, where the starting diol is 4,4-dichloro-1,2-dihydroxypentane, the product is 4-chloro-3-penten-1,2-diol.

The process of the invention comprises mixing a solution of the starting diol and a solution of the base, and reacting the mixture for the time sufficient to remove hydrogen halide (HY) in the form of its salt with the base employed.

The base utilized in the process of this invention may be any alkali metal or alkaline earth metal hydroxide; for example, potassium hydroxide, sodium hydroxide, lithium hydroxide, barium hydroxide or magnesium hydroxide. Preferably, the base is sodium or potassium hydroxide.

The proportions of reactants utilized may be varied widely. However, since a mole of the alkali or alkaline earth metal halide is formed for each mole of the product, at least about 1 mole of the hydroxide must be employed for each mole of diol sought to be converted. The reaction is preferably carried out in the presence of at least a slight excess of the base, up to about 1.1 moles of the base mole of starting diol.

Preferably, the amount of base employed is between 0.80 mole to 1.1 moles of the base per mole of the starting diol.

The solvent employed in the process of this invention may be any inert solvent which dissolves both the starting material and the hydroxide. Examples of such solvent include oxygen-containing solvents such as dioxane, ethers such as diglyme, and lower alcohols such as ethanol, butanol and the like. However, the reaction may be carried out employing an aqueous solution of the hydroxide, the starting diol being dispersed therein by stirring.

The reaction conditions employed to produce the products of this invention may vary widely. For example, the reaction may be carried out at room temperature. However, somewhat elevated temperatures, up to about 125° C., are usually employed in order to obtain industrially practical reaction times. Usually the reaction is conducted between about 60° C. and 100° C.

The compounds of this invention may be recovered from the reaction mixture by conventional techniques known to the organic chemist. For example, where an organic solvent is employed in the reaction, solid metal halide salt is filtered off and the filtrate evaporated to dryness. The residue is then dissolved in a water-immiscible solvent and the solvent layer washed with water to remove remaining salts and base. The solvent phase is then worked up, removing the solvent and allowing the product to crystallize. Where an oil results, the product may be recovered by distillation at reduced pressures. The resultant product may be further purified by repeated crystallization and/or distillation. Where water is employed as a reaction medium, the product may be recovered by adding a water-immiscible solvent and working up the solvent layer in a similar manner. Alternative methods of recovery include chromatography and steam distillation.

There is set forth below an example which illustrates the method of producing the compounds of this invention. This example is, of course, given by way of illustration only and should not be construed as limiting the invention to the particular details thereof. All parts and percentages set forth as true throughout the specification are by weight unless otherwise specified.

Example.—4,4-dichloro-3-buten-1,2-diol

A mixture of 11.9 grams (0.0615 mole) of 4,4,4-trichloro-1,2-butanediol, 4.06 grams (0.0615 mole) of potassium hydroxide and 50 milliliters of methanol was refluxed (69° C.) for 4 hours. The mixture was then allowed to cool and was filtered to obtain 3.9 grams (0.053 mole) of potassium chloride. The filtrate was evaporated, the residue dissolved in ether, and the resulting solution washed with water and dried. Removal of the ether and distillation of the residue gave 7.6 grams of a liquid, boiling point 84° C.–87° C. (0.1 milimeter of mercury) which solidified on standing, melting point 47° C.–52° C. Several recrystallizations from a mixture of benzene and petroleum hexane gave the analytical sample of the diol of the title as a white solid, melting point 51° C.–52° C., showing a strong band at 3.05 microns and a medium band at 6.16 microns in the infrared. Its nuclear magnetic resonance spectrum (in $CDCl_3$) showed a doublet 6.13 parts per million (olefinic) and broad unresolved bands at 4.6, 4.4, 4.1 and 3.7 parts per million (downfield from tetramethylsilane). Addition of HCl vapor to the sample caused a better resolution of the broad bands so that the spectrum now showed a doublet at 6.13 parts per million (1 proton), a multiplet at 4.7 parts per million (3 protons), and a multiplet at 3.7 parts per million (2 protons).

Analysis.—Calculated for $C_4H_6Cl_2O_2$: C, 30.60; H, 3.85; Cl, 45.16. Found: C, 30.55; H, 3.66; Cl, 45.06.

In a similar manner when the starting diol is 4,4-dichloro-1,2-dihydroxypentane, the product will be 4-chloro-3-penten-1,2-diol. Likewise, 4,4,4-tribromo-1,2-dihydroxybutane will yield 4,4-dibromo-3-buten-1,2-diol; 4,4-dibromo-1,2-dihydroxyhexane will yield 4-bromo-3-hexen-1,2-diol; and 4,4,4-trichloro-1,2-dihydroxy - 3 - methylbutane will yield 4,4-dichloro-3-methyl-3-buten-1,2-diol.

The compounds of this invention contain two hydroxyl groups and therefore find utility similar to other known diols. The compounds of the invention may be used as polar solvents. The compounds also contain unsaturation which provides an additional reactive site, making the compounds of the invention versatile chemical intermediates. For example, the compounds of the invention may be reacted with acrylyl chloride or methacrylyl chloride to produce unsaturated monomer, which may be homopolymerized or copolymerized with other unsaturated monomers, such as ethyl acrylate, methyl methacrylate of styrene, to produce polymers which are useful as decorative and protective coatings for wood and metal. In addition, the diols of this invention, especially since they contain unsaturation and halogen atoms, which contribute fire retardant properties, find utility in polyester resins. For example, the compounds of this invention may be reacted either alone or together with other diols, such as ethylene glycol, diethylene glycol and propylene glycol, or with dibasic acids, such as maleic anhydride or phthalic anhydride, to form polyester resins.

Although specific examples of the invention have been set forth, it is not intended to limit the invention solely thereto, but to include all of the variations and modifications falling within the scope of the appended claims.

I claim:

1. A compound of the formula:

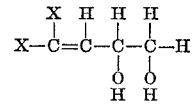

where X is selected from the group consisting of chlorine and bromine.

2. A compound as in claim 1 which is 4,4-dichloro-1,2-dihydroxy-3-butene.

3. A compound as in claim 1 which is 4,4-dibromo-1,2-dihydroxy-3-butene.

References Cited

UNITED STATES PATENTS 2,561,516    7/1951    Ladd et al. _____ 260—633
3,284,515    11/1966    Dickerson et al. ____ 260—633

OTHER REFERENCES

Petrov, C. A. 35 4348² QD 1A51.
Dowbenko, Chemistry and Industry, 1965 (32) pp. 1425–26 TP 1563.

BERNARD HELFIN, *Acting Primary Examiner.*

H. MARS, *Assistant Examiner.*